Patented July 13, 1937

2,086,713

UNITED STATES PATENT OFFICE 2,086,713

PRODUCTION OF HYDROXY OLEFIN COMPOUNDS

Adolf Grün, Basel, Switzerland, assignor to H. Th. Bohme Aktiengesellschaft, Chemnitz, Saxony, Germany No Drawing. Application November 1, 1933, Serial No. 696,246. In Germany November 4, 1932

15 Claims. (Cl. 260—156)

This invention relates to the production of hydroxy olefin compounds from dihydroxy compounds by subjecting the latter to heat at elevated temperatures in the presence of a metal hydroxide catalyst.

The sulfates and sulfate salts of certain of the unsaturated alcohols have superior properties to the corresponding saturated compounds in the wetting and cleansing arts. The unsaturated alcohols are often difficult to obtain because of the few sources available and of the difficulty of the process of producing the same. Consequently, one of the principal objects of the present invention is to convert saturated alcohols into unsaturated alcohols.

Another object of the present invention is to provide a simple process of producing olefin compounds operable at low cost.

The invention is applicable to polyhydroxy compounds in general but particularly to dihydroxy alcohols such as 1,12-octodecandiol, octadecen-9-diol-1,12 and their homologues and to dihydroxy acids such as dihydroxy stearic acid. In all cases, a $CH_2$—CHOH group is converted into a CH=CH group with the loss of water, the resulting compound being an olefine corresponding in structure or number of carbon atoms to the organic compound treated. The surprising result of the instant process is the fact that only one of the two hydroxyl radicals is removed forming one double bond, the hydroxyl group removed being almost always a secondary hydroxyl radical.

Though many metal hydroxides have been found to cause the desired reaction to occur to an appreciable extent, the hydroxides of aluminum, zirconium, titanium, and thorium, which metals are weakly basic, have proved by far the most satisfactory.

The proportion of the catalyst to the compound treated appears to be of little importance though a quantity below a certain minimum, of course, gives decreased yields. About 2 parts of catalyst per 100 of compound treated is about the minimum but this amount may be varied according to the material treated, the catalyst used, the degree of distribution or available surface of the catalyst in a carrier, and the temperatures employed. It is seldom necessary to use an amount of catalyst in excess of equimolecular proportions.

As above indicated, the catalyst is preferably first distributed and deposited on a carrier such as diatomaceous earth, clay, or artificially prepared gels, for example, silica gel, by any of the known methods for accomplishing the same.

In carrying out the reaction, the temperature to which the polyhydroxy compound and catalyst is heated is preferably above the boiling point of water and below the boiling point of the organic compound treated. The minimum temperature at which the reaction will occur to an appreciable extent is in most cases at about 180° C. In obtaining best results, it is desirable to heat the compound and catalyst to a temperature somewhat above the boiling point of water suitably at about 220° to 250° C. for a period sufficient for most of the water to be evaporated off. When the rapid evaporation of water has ceased or almost ceased the temperature is preferably raised to a point slightly or somewhat below the boiling point of the organic compound treated. When the reaction is finished, the new compound is separated from the catalyst by filtration, centrifuging or other method.

The time of heating in general is suitably between about 1 and 4 hours. For any particular reaction the optimum time can be determined easily by experiment.

The process is more successfully carried out if the reaction is effected in the absence of air. This result may be most easily carried out by introducing into the vessel an inert gas, such as for example, nitrogen. Mechanical agitation of the mass also assists, but such is not necessary.

Example 1

100 parts of 1,12 octodecandiol obtained suitably by reduction of 12-hydroxystearic acid are heated during agitation with 2.5 parts of aluminum hydroxide deposited upon kieselguhr. Nitrogen is then introduced into the reaction vessel to eliminate the air present. When the temperature reaches about 220° C. water vapor begins to evaporate rapidly from the reaction mixture. As soon as water separation diminishes or stops entirely the temperature of the mass is allowed to rise to about 300° C. or higher and is maintained at this temperature until the reaction is finished. Thereafter the octodecenol formed is separated from the aluminum hydroxide by filtration or centrifuging. The product is a colorless and odorless, oily fluid having a boiling point of about 320 to 324° C. and coagulates into soft crystals if permitted to stand for a protracted period. Its iodine number is 93, whereas, the calculated number for octodecenol is 94.

Example 2

A thorium hydroxide catalyst is prepared by precipitating thorium nitrate from solution by means of a sodium carbonate solution upon diatomaceous earth, washing and drying at a low temperature, whereby a product containing about 20% thorium by weight is produced.

100 parts of 1,12 octodecandiol are agitated with 3 to 5 parts of the thorium hydroxide catalyst above described and heated to a temperature between 220 to 250° C. during agitation and during the introduction of nitrogen. When the separation of water ceases the mass is heated further to a temperature of about 300 to 305° C. until the reaction is finished. The octodecenol produced is separated from the catalyst by filtration.

The above reaction may be carried out with the use of zirconium hydroxide or titanium hydroxide. Also other compounds than octodecandiol may be in this manner treated and such compounds may contain secondary or tertiary hydroxyl groups. Such materials are converted into the olefin alcohols or their derivatives or substitution products.

I claim:

1. The process of producing olefin alcohols comprising mixing an aliphatic dihydroxy alcohol in the liquid phase with a catalyst selected from the group consisting of aluminum, zirconium, titanium and thorium hydroxides, and heating the mixture at a temperature above the boiling point of water until the reaction is complete.

2. The process of producing olefin alcohols comprising mixing an aliphatic dihydroxy alcohol with a catalyst selected from the group consisting of aluminum, zirconium, titanium and thorium hydroxides, and heating the mixture at a temperature above the boiling point of water and below the boiling point of the compound treated until the reaction is finished.

3. The process as described in claim 1 wherein the mixture is heated to a temperature somewhat above the boiling point of water until at least most of the water is vaporized off and then heated at a higher temperature somewhat below the boiling point of the alcohol treated until the reaction is finished.

4. The process as described in claim 2 wherein the alcohol treated is 1,12 octadecandiol and the olefine produced is octodecenol.

5. In the production of hydroxy olefin compounds from aliphatic polyhydroxy compounds by heating the latter in the presence of a catalyst, the improvement comprising contacting the polyhydroxy compound while in the liquid phase with a metal hydroxide catalyst of which the metal is selected from the group consisting of aluminum, zirconium, titanium and thorium.

6. The process of producing hydroxy olefin compounds comprising contacting a polyhydroxy compound selected from the group consisting of aliphatic polyhydroxy alcohols and carboxylic acids, with a metal hydroxide catalyst, said metal being selected from the group consisting of aluminum, zirconium, titanium and thorium, heating the mixture in the liquid phase at a temperature above the boiling point of water but not substantially higher than the boiling point of the polyhydroxy compound treated, said heating being for a period of from one to four hours until the reaction is complete.

7. The process of producing hydroxy olefin compounds comprising, mixing an aliphatic dihydroxy compound with a weakly basic metal hydroxide dehydrating catalyst and heating at a temperature above the boiling point of water but not substantially higher than the boiling point of the hydroxy compound treated until the reaction is complete.

8. The process of producing hydroxy olefin compounds comprising, mixing an aliphatic polyhydroxy compound with a compound selected from the group consisting of aluminum, zirconium, titanium and thorium hydroxides, and heating the mixture at a temperature above the boiling point of water but not substantially higher than the boiling point of the hydroxy compound treated until the reaction is complete.

9. The process as described in claim 8 wherein an aliphatic polyhydroxy alcohol is converted into an olefin alcohol.

10. The process as described in claim 8 wherein the reaction is carried out in the absence of air.

11. The process as described in claim 7 wherein the compound treated is a dihydroxy compound having a primary and a secondary hydroxy radical and the olefine obtained is one having a primary hydroxy group.

12. In the production of hydroxy olefin compounds from aliphatic polyhydroxy compounds by heating the latter in the presence of a catalyst, the improvement comprising contacting the polyhydroxy compound with a weakly basic metal hydroxide dehydrating catalyst at a temperature above the boiling point of water but not substantially higher than the boiling point of the hydroxy compound treated until the reaction is complete.

13. The process of producing hydroxy olefin compounds comprising mixing an aliphatic dihydroxy compound with a weakly basic metal hydroxide dehydrating catalyst and heating the mixture in the liquid phase to a temperature above the boiling point of water but not substantially higher than the boiling point of the dihydroxy compound treated.

14. The process of producing unsaturated higher aliphatic primary alcohols comprising mixing a polyhydroxy higher aliphatic alcohol having both primary and nonprimary hydroxy groups while in the liquid phase with a weakly basic metal hydroxide dehydrating catalyst and heating the mixture to a temperature above the boiling point of water but not substantially higher than the boiling point of the alcohol treated.

15. The process as described in claim 14 wherein the contact is conducted in the substantial absence of air.

ADOLF GRÜN.